(12) United States Patent
Lim et al.

(10) Patent No.: US 8,723,480 B2
(45) Date of Patent: May 13, 2014

(54) CHARGE EQUALIZATION APPARATUS FOR SERIES-CONNECTED BATTERY STRING USING REGULATED VOLTAGE SOURCE

(75) Inventors: Jae Hwan Lim, Daejeon (KR); Sang Hyun Park, Daejeon (KR); Joong Hui Lee, Daejeon (KR); Gun-Woo Moon, Daejeon (KR); Hong-Sun Park, Daejeon (KR); Chol-Ho Kim, Daejeon (KR)

(73) Assignees: SK Innovation Co., Ltd., Seoul (KR); Korea Advanced Institute of Science and Technology, Daejeon (KR)

( * ) Notice: Subject to any disclaimer, the term of this patent is extended or adjusted under 35 U.S.C. 154(b) by 353 days.

(21) Appl. No.: 13/146,867

(22) PCT Filed: Apr. 17, 2009

(86) PCT No.: PCT/KR2009/001999
§ 371 (c)(1),
(2), (4) Date: Jul. 28, 2011

(87) PCT Pub. No.: WO2010/087545
PCT Pub. Date: Aug. 5, 2010

(65) Prior Publication Data
US 2011/0285352 A1    Nov. 24, 2011

(30) Foreign Application Priority Data

Jan. 30, 2009    (KR) .................. 10-2009-0007567

(51) Int. Cl.
*H02J 7/00*    (2006.01)
(52) U.S. Cl.
USPC .......................................... 320/118; 320/116
(58) Field of Classification Search
USPC .......................................................... 320/118
See application file for complete search history.

(56) References Cited

U.S. PATENT DOCUMENTS

| | | | |
|---|---|---|---|
| 2007/0009770 A1* | 1/2007 | Takada et al. | 429/9 |
| 2007/0090799 A1* | 4/2007 | Lee et al. | 320/118 |
| 2007/0222416 A1 | 9/2007 | Sato | |
| 2007/0225860 A1* | 9/2007 | Sheppard et al. | 700/236 |
| 2008/0197806 A1* | 8/2008 | Ridder et al. | 320/119 |
| 2008/0211456 A1 | 9/2008 | Bolz et al. | |

FOREIGN PATENT DOCUMENTS

| | | | |
|---|---|---|---|
| JP | 09298843 A | 11/1997 | |
| JP | 10-32936 A | 2/1998 | |
| JP | 2004-194410 A | 7/2004 | |
| JP | 2005086867 A | 3/2005 | |

(Continued)

*Primary Examiner* — Arun Williams
(74) *Attorney, Agent, or Firm* — The Webb Law Firm

(57) ABSTRACT

An automatic charge equalization apparatus using a regulated voltage source according to the present invention comprises a battery module having a plurality of batteries connected in series; a battery string having M (natural number of M≥2) battery modules connected in series: a regulated voltage source which is provided for each battery module and outputs and maintains an average voltage of the battery string; a bidirectional switch block which is provided for each battery module between the battery module and the regulated voltage source to connect each battery to an output of the regulated voltage source by forming a parallel current moving path to each battery composing the battery module; and a microprocessor controlling the bidirectional switch block, wherein each battery composing the battery module shares the regulated voltage source by the bidirectional switch block and the microprocessor controls the bidirectional switch block to successively connect the batteries composing the battery module with the regulated voltage source.

12 Claims, 6 Drawing Sheets

(56) References Cited

FOREIGN PATENT DOCUMENTS

| | | |
|---|---|---|
| JP | 2008-199798 A | 8/2008 |
| JP | 2008-220110 A | 9/2008 |
| KR | 2003-0096978 A | 12/2003 |
| KR | 10-2006-0078967 A | 7/2006 |
| KR | 10-2007-0064244 A | 6/2007 |
| KR | 10-0778414 B1 | 11/2007 |
| KR | 10-2007-0119433 A | 12/2007 |
| KR | 10-0831160 B1 | 5/2008 |
| WO | 2006100264 A2 | 9/2006 |
| WO | 2007145460 A1 | 12/2007 |
| WO | 2008097031 A1 | 8/2008 |

* cited by examiner

CHARGE EQUALIZATION APPARATUS FOR SERIES-CONNECTED BATTERY STRING USING REGULATED VOLTAGE SOURCE

TECHNICAL FIELD

The present invention relates to a charge equalization apparatus for series-connected battery string, and more particularly to a charge equalization apparatus using simple circuits without using a voltage sensing unit measuring a voltage of the battery and an analog-digital converter.

BACKGROUND ART

If a voltage higher than a reference voltage of a unit battery (cell) is needed such as in a hybrid vehicle which uses a lithium ion cell as a power source, it is typical to connect a plurality of unit batteries in series. However, even though the batteries produced via the typical manufacturing method have the same structure using the same anode, cathode and electrolyte, there is existed a difference in charge or discharge characteristics between each battery connected in series.

Therefore, since a voltage difference exists between the unit batteries when using the batteries connected in series, there are problems in that a total voltage (total voltage of batteries connected in series) becomes zero so that a recharge is needed even though one battery is totally discharged irrespective of voltage of the other batteries in the unit batteries connected in series, the battery reaching the certain voltage at first is overcharged due to different voltage between each battery even at the time of the recharge, and the battery which still does not reach any certain voltage exists even though some batteries are overcharged.

Further, if the number of charging/discharging times is higher, significant degradation can occur in materials composing the battery so that characteristics of the battery become different and such degradation is responsible for aggravating the difference between the individual cells.

Therefore, in order to address such problems, various charge equalization apparatuses are actively proposed to achieve charge equalization of the batteries connected in series.

As an example, Korean Patent Laid-Open No. 2006-0078967 is directed to a system which is consisted of a serial battery pack; two or more battery modules composing the serial battery pack; a monitoring module sensing a voltage of the battery module; a switch module; a control module controlling the monitoring module and the switch module, to bypass the battery module of which the current reaches a certain voltage value by controlling the switch module via the control module if the voltage of the battery module reaches the certain voltage upon charging the battery pack. Korean Patent Laid-Open No. 2003-0096978 is directed to a system which is consisted of a plurality of unit cells, a charging means, a discharging means, and serial-parallel conversion switch, and performs charging by discharging the plurality of unit cells equally and then connecting the discharged unit cells in series using the serial-parallel conversion switch. Korean Patent Laid-Open 2007-0064244 is directed to a system which comprises a battery unit, a field-effect transistor unit connected to the battery unit, an amplifying unit connected to the field-effect transistor unit, a multiplexer controlling an output signal of the amplifying unit, a comparator comparing and determining a variation in a voltage signal of the battery unit, an A/D converting unit converting the output from the comparator into a digital signal, a Micom unit inputted with the signal outputted from the A/D converter and outputting a signal corresponding to the charging/discharging condition, a switching unit supplying the battery equalization current in accordance with the signal of the Micom unit, and a known charging/discharging circuit.

Further, Japanese Patent Laid Open No. 2008-220110 is directed to a system consisted of a secondary battery having a plurality of battery cells connected; a switch element controlling charge/discharge of the secondary battery; a measuring unit measuring each voltage of the battery cells and detecting a maximum voltage of the battery cell; a switch element control unit controlling the switch element on a basis of the detected voltage of the measuring unit; a storage means storing charge completion voltage and maximum charge current value; a charge current specific-value control unit changing the charge current value in accordance with the detection voltage of the battery cell. Japanese Patent Laid Open No. 2008-199798 is directed to a system consisted of a serial-connected battery block group; a discharging circuit group connected in serial with each other and connected in parallel to each of the battery blocks by the switch group; a charging circuit group connected in parallel to the discharging circuit while being connected in serial with each other and connected in parallel to each of the battery blocks by the switch group; a charging/discharging control unit controlling the discharging circuit group, the charging circuit group, and the switch group. Japanese Patent Laid Open No. 1998-032936 is directed to a system which is consisted of a plurality of unit cells, a detection means for detecting remaining capacity in each unit cell, a charge replacement means and a discharge replacement means for performing charging and discharging on each unit cell, a control means for controlling charging and discharging in each unit cell separately, and a direct current/direct current converter performing charging and discharging separately on each unit cell. Japanese patent Laid Open No. 2004-194410 is directed to a system which is consisted of two or more unit cell groups, a current difference detection means for detecting a difference in currents flowing in each of a first cell group and a second cell group, and a means for controlling charging/discharging current in the cell group based on the difference in currents.

U.S. Patent Laid-Open No. 2007-0222416 is directed to a system which is consisted of a backflow prevention switch connected between a battery and a ground; a charging switch; a serial circuit of a resistor for detecting the current; a charging control circuit controlling the backflow prevention switch and the charging switch and detecting a difference voltage between a regulated voltage of the battery and a open voltage of the battery while repeating charging and opening of the battery; and a regulated current-regulated voltage control circuit controlling the charging regulated voltage based on the difference voltage detected.

However, since the above-mentioned charge equalization apparatuses have a charge equalization apparatus provided in each of the batteries connected in series so that charging or discharging is performed separately on each battery and each voltage of the batteries is measured and converted to the digital value separately to determine whether or not to charge or discharge the battery and to set charge equalization conditions based on the voltage of the battery, there are problems that complexity and volume of the charge equalization apparatus are increased and thus productivity is reduced and production cost is higher, and components composing the charge equalization apparatus or the switch module for controlling it must endure higher voltage stress.

DISCLOSURE OF INVENTION

Technical Problem

An object of the present invention is to provide a charge equalization apparatus which is capable of performing charge equalization efficiently and performing design change easily while reducing complexity, volume and production cost of the charge equalization apparatus which performs charge equalization on a series-connected battery string.

More specifically, another object of the present invention is to provide a charge equalization apparatus which is capable of perform charge equalization efficiently using very simple structure without a voltage sensing unit sensing a voltage of individual battery and an analog-digital converter.

Technical Solution

To achieve the above objects, the present invention provides an automatic charge equalization apparatus using a regulated voltage source comprising a battery module having a plurality of batteries connected in series; a battery string having M (natural number of M≥2) battery modules connected in series: a regulated voltage source which is provided for each battery module and outputs and maintains an average voltage of the battery string; a bidirectional switch block which is provided for each battery module between the battery module and the regulated voltage source to connect each battery to an output of the regulated voltage source by forming a parallel current moving path to each battery composing the battery module; and a microprocessor controlling the bidirectional switch block, wherein each battery composing the battery module shares the regulated voltage source by the bidirectional switch block and the microprocessor controls the bidirectional switch block to successively connect the batteries composing the battery module with the regulated voltage source.

As mentioned above, the automatic charge equalization apparatus according to the present invention can accomplish charge equalization of the battery string by connecting (meaning to from the current moving path) the regulated voltage source with each battery successively using the bidirectional switch block, without a need for sensing the voltage of each battery and changing it to a digital value to select the battery to be charged or discharged.

The microprocessor independently controls the bidirectional switch block for each battery module and successively forms the current moving path between each battery and the output of the regulated voltage source starting from a uppermost battery or a lowermost battery of the batteries composing the battery module.

Since the regulated voltage source is provided for each battery module, M regulated voltage sources are provided if the battery string is consisted M (natural number of M≥2) battery modules. Further, since the bidirectional switch block which forms the current moving path between the regulated voltage source and the battery module is also provided for each battery module, M bidirectional switch blocks are provided if the number of battery modules is M.

The regulated voltage source comprises a bidirectional DC-DC converter, and the bidirectional DC-DC converter is inputted with total voltage of the battery string and outputs and maintains an average voltage of the battery string.

Specifically, the automatic charge equalization apparatus further comprises a converter switch which controls ON/OFF operation of DC-DC converter in each terminal of a primary winding of an input and a secondary winding of an output in the bidirectional DC-DC converter, in which the converter switch is controlled by a PWM signal.

For the purpose of it, the automatic charge equalization apparatus further comprises a pulse width modulation (PWM) signal generator generating a PWM signal, in which the converter switch is controlled by the PWM signal and the bidirectional DC-DC converter outputs and maintains the average voltage of the battery string by a duty ratio of the PWM signal.

The PWM signal generator further comprises a duty ratio controller, in which the duty ratio controller compares an output of the regulated voltage source with the average voltage of the battery string to change the duty ratio of the PWM signal so that the output of the regulated voltage source is maintained at an average voltage of the battery string to charge or discharge each battery composing the battery module.

Specifically, the PWM signal generator further comprises a capacitor provided between the bidirectional switch block and the bidirectional DC-DC converter, and the capacitor is allowed to maintain a regular voltage and supply a direct current to each battery composing the battery module.

As mentioned above, the capacitor is provided in a rear terminal of the bidirectional switch block and a front terminal of the bidirectional DC-DC converter, so that the microprocessor controls the bidirectional switch block to connect the capacitor to one battery (belonging to the corresponding battery module of the bidirectional switch unit) in which the parallel current moving path is formed.

The corresponding bidirectional switch block of the battery module consisted of k (natural number of k≥2) batteries comprises 2K bidirectional switches and the bidirectional switch is connected to both terminals of one battery respectively on a basis of the one battery composing the battery module to form the parallel current moving path.

The bidirectional switch block comprises multiple bidirectional Metal Oxide Semi-conductor Field Effect Transistor (MOSFET) switches, and Vgs applied upon turning on the MOSFETs composing the bidirectional MOSFET switch is a voltage of two or more series-connected batteries which is one part of the battery string.

The regulated voltage source comprises a bidirectional DC-DC converter, and the output of the bidirectional DC-DC converter is preferably connected in parallel to multiple switches composing the bidirectional switch block. Specifically, one side of each of the odd bidirectional switches is connected in parallel to allow it to be connected to one terminal of a secondary winding which is an output of the bidirectional DC-DC converter and one side of each of even bidirectional switches is connected in parallel to allow it to be connected to other terminal of a secondary winding which is an output of the bidirectional DC-DC converter on a basis of a lowermost battery $B_{3,k}$ or a uppermost battery $B_{3,1}$ of the batteries composing the battery module.

Preferably, the bidirectional switch block comprises multiple bidirectional Metal Oxide Semiconductor Field Effect Transistor (MOSFET) switches, and Vgs applied upon turning on the MOSFETs composing the bidirectional MOSFET switch is a voltage of two or more series-connected batteries which is one part of the battery string.

An electronic relay is provided in a gate of the MOSFET composing the bidirectional MOSFET switch, in which the electronic relay preferably comprises a light-emitting diode and a light-receiving element, and the light-emitting diode is emitted under the control of the microprocessor for controlling the bidirectional switch block.

The automatic charge equalization apparatus using a regulated voltage source further comprises a battery-string regulated voltage source which is inputted with total voltage of the battery string and outputs lower voltage than the voltage inputted, in which an input of all the regulated voltage sources is connected in parallel to an output of the battery-string regulated voltage source.

The battery-string regulated voltage source comprises a single DC-DC converter, in which the DC-DC converter is inputted with total voltage of the batter string and its output is connected to inputs of the regulated voltage sources.

Advantageous Effects

The automatic charge equalization apparatus using a regulated voltage source according to the present invention has advantages in that expensive parts such as the sensing unit sensing individual voltage of the battery and the analog-digital converter are not needed since charge equalization is performed by connecting the regulated voltage source with each battery successively, and the number of components can be markedly reduced and thus complexity and volume of the charge equalization apparatus are reduced and the production cost is reduced as the battery belonging to each battery module shares the regulated voltage source via the bidirectional switch unit.

Further, it is possible to structure the charge equalization apparatus flexibly and easily even the number of total batteries is changed by dividing the total battery string into battery modules and providing the bidirectional switch unit and the regulated voltage source for each module, to cope with degradation and damage of the components caused due to long-term usage, and to use low voltage bidirectional switch having low internal voltage in order to structure the bidirectional switch unit. Further, it is possible to output the regulated voltage using the DC-DC converter having low capacity.

BRIEF DESCRIPTION OF DRAWINGS

The above and other objects, features and advantages of the present invention will become apparent from the following description of preferred embodiments given in conjunction with the accompanying drawings, in which.

BEST MODE FOR CARRYING OUT THE INVENTION

Figure 1:
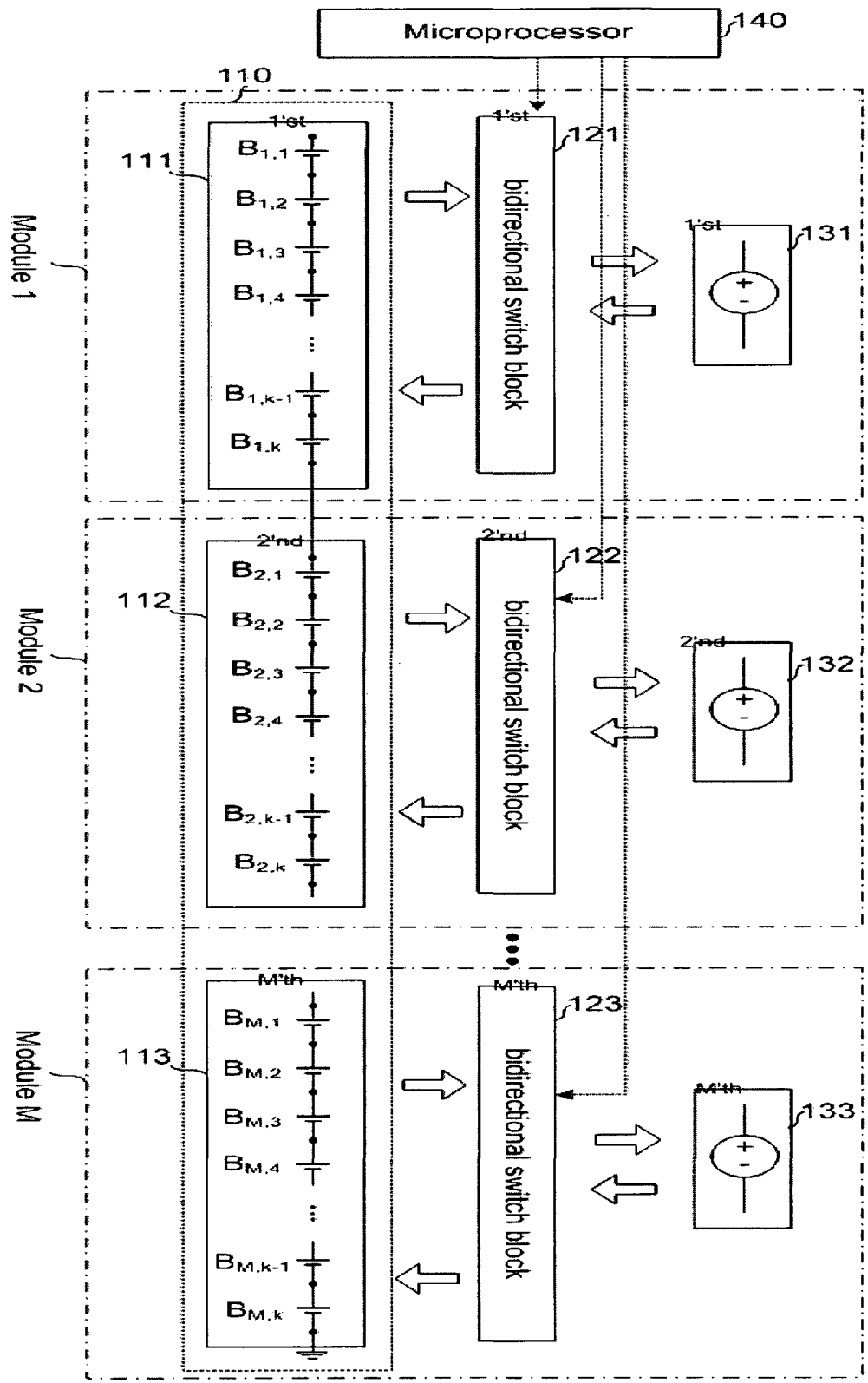
FIG. 1 is one structure diagram of an automatic charge equalization apparatus according to the present invention.

Hereinafter, a charge equalization apparatus and method according to the present invention will be described in detail with reference to accompanying drawings. The accompanying drawings are provided as an example sufficiently to deliver an idea of the present invention to the person skilled in the art. Therefore, the present invention is not bounded by the drawings presented hereinafter but can be specified in another form. Further, like reference numerals denote like element throughout the following detailed description of the invention.

At this time, if the technological terms and science terms used herein do not have any other definition, they have meanings that can be typically understood by the person skilled in the art. Further, known functions and structures which can unnecessary make obscure the subject matter of the present invention in the following description and accompanying drawings will be omitted.

FIG. 1 shows one example of an automatic charge equalization apparatus using a regulated voltage source according to the present invention. In FIG. 1, solid-line arrows denote a connection path and dotted-line arrows denote a control signal.

As shown in FIG. 1, a battery string 110 having a plurality of batteries $B_{1,1}$ to $B_{M,k}$ connected in series is divided into a plurality of battery module 111, 112, 113 having two or more batteries connected in series. FIG. 1 shows a case in which the battery string is structured with total M (M≥2) battery modules 111, 112, 113 and the number of the serial-connected batteries composing each battery module 111, 112, 113 is k (k≥2). One battery composing the battery string in FIG. 1 is dented as if the battery belongs to the ith (natural number of i≥1) module and is located in the jth (natural number of j≥1) row on a basis of a uppermost battery in ith module. Though it is shown that the number of batteries composing each battery module 111, 112, 113 is k ($B_{1,k}$, $B_{2,k}$, $B_{M,k}$) identically for all modules in FIG. 1, the number of batteries composing each battery module may be different from one another.

Each battery module 111, 112, 113 is provided with bidirectional switch block 121, 122 or 123 for each battery module. The bidirectional switch block 121 forms a parallel current moving path to each battery ($B_{1,1}$ to $B_{1,k}$) composing the corresponding battery module 111 and one battery (as an example, $B_{2,2}$) composing the battery string 110 is connected to a regulated voltage source 131, 132 or 133 which is provided for each battery module 111, 112, 113 by the bidirectional switch block.

The microprocessor 140 controls the bidirectional switch blocks 121, 122 123 to connect the individual battery belonging to the same battery module 111, 112 or 113 to the regulated voltage source 131, 132 or 133 of the corresponding battery module.

Specifically, the microprocessor 140 is structured not to receive the voltage of the individual battery composing the battery string and not select the battery to be charged or discharged by comparing an average voltage of the battery string with a voltage of the individual battery, but successively connect all batteries composing the battery module 111, 112 or 113. The successive connection means connection according to a location of the battery on a basis of the battery located uppermost or lowermost in one battery module and the automatic charge equalization apparatus according to the present invention performs charge equalization by connecting each battery composing the battery module to the regulated voltage source successively.

At this time, the microprocessor 140 independently controls a plurality of bidirectional switch blocks so that charge equalization may be independently performed on each battery module. Therefore, the automatic charge equalization apparatus according to the present invention is characterized in that all batteries composing the single battery module 111, 112 or 113 can be equalized with the average voltage of the battery string and at the same time all batteries composing the battery string 110 can be equalized with the average voltage of the battery string.

As the automatic charge equalization apparatus according to the present invention is structured such that the battery string 110 is divided into the battery modules and each battery module is provided with the bidirectional switch block and the regulated voltage source, the automatic charge equalization apparatus is consisted of modules (module 1, module 2, module M in FIG. 1) which includes the battery module, the corresponding bidirectional switch block, the corresponding regulated voltage source. Further, all batteries belonging to the same battery module shares the regulated voltage source by the corresponding bidirectional switch block.

The automatic charge equalization apparatus according to the present invention can perform charge equalization effectively without a need of the sensing unit measuring each voltage of the battery and the analog-digital converter. Though the number of batteries composing the battery string 110 is changed, it is possible to change and extend the apparatus via addition or removal of the module (module 1, module 2, module M). Since the circuit for each battery module is separated, there are advantages that it is possible to implement the circuit easily; cope with circuit damage caused due to degradation of the element efficiently; and enhance design flexibility.

Figure 2:
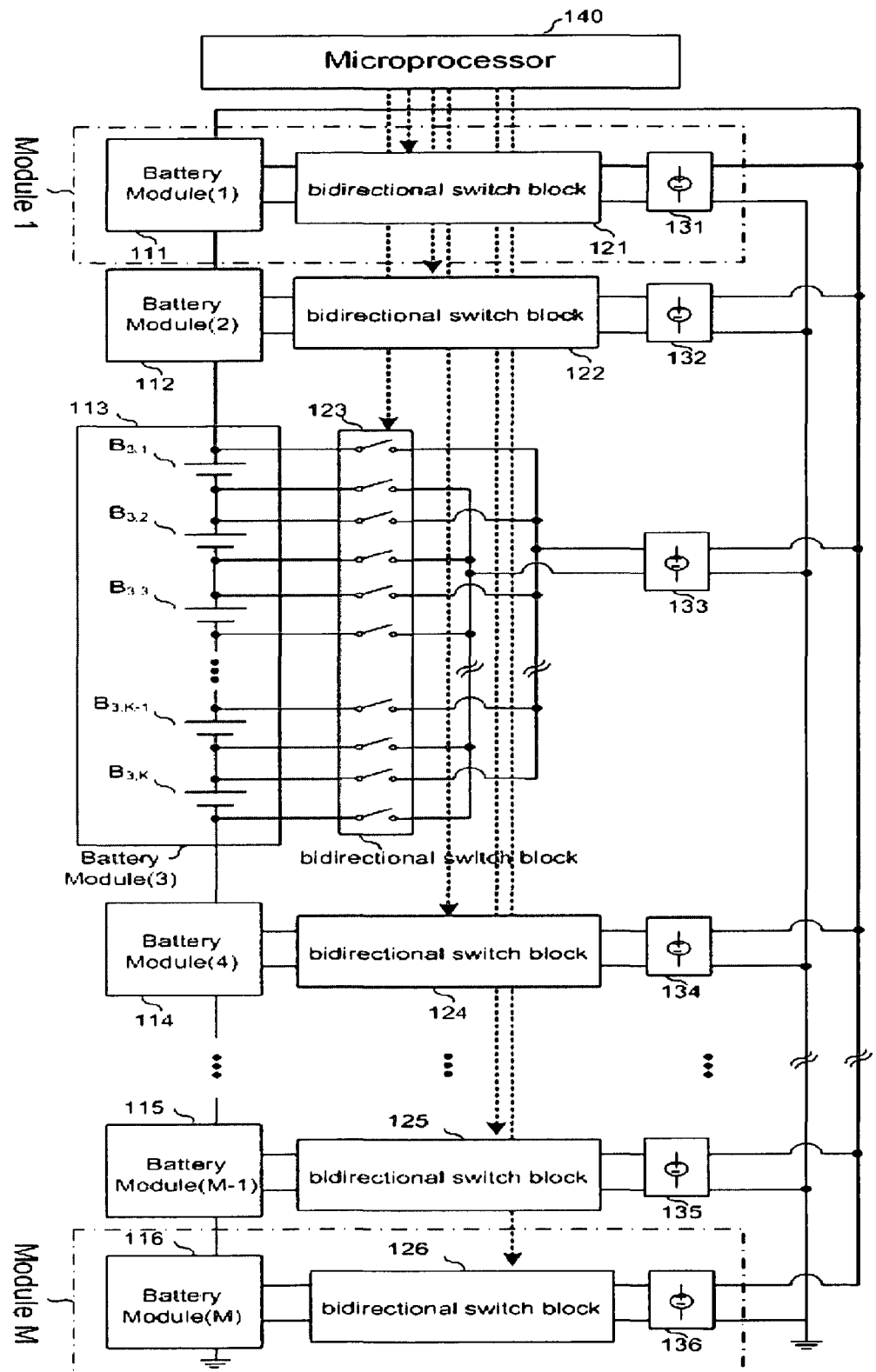
FIG. 2 is a diagram showing more detailed structure of the automatic charge equalization apparatus of FIG. 1 according to the present invention.

FIG. 2 is a drawing showing more detailed structure of one example shown in FIG. 1. As shown in FIG. 2, the corresponding bidirectional switch block 121~126 of the battery module consisted of k (natural number of k≥2) batteries includes 2K bidirectional switches. On a basis of one battery composing the battery module, the bidirectional switch is connected to each of an anode and a cathode of the one battery to form the parallel current moving path.

The bidirectional switch is preferably a switch capable of bidirectional current movement using a Metal Oxide Semiconductor Field Effect Transistor (MOSFET), a Bipolar Junction Transistor (BJT), a relay or a combination of them and more preferably a bidirectional MOSFET switch using the MOSFET.

As shown in the bidirectional switch block 123 of FIG. 2, the corresponding bidirectional switch block 123 of the battery module 113 consisted of k (natural number of k≥2) batteries preferably includes 2K bidirectional MOSFET switches.

The bidirectional switch (preferably bidirectional MOSFET switch) included in the corresponding bidirectional switch block 123 of one battery module 113 has one side of each of the odd bidirectional switches connected in parallel to allow it to be connected to high potential (or low potential) output of the corresponding regulated voltage source 133 and one side of each of even bidirectional switches connected in parallel to allow it to be connected to low potential (or high potential) output, on a basis of a lowermost battery $B_{3,k}$ or a uppermost battery $B_{3,1}$ of the batteries composing the battery module.

Specifically, the bidirectional switch composing the bidirectional switch block 123 has one side connected to a node between the batteries connected in series and the other side connected to an output of the regulated voltage source 133. The bidirectional MOSFET switches belonging to the bidirectional switch block and not adjacent to each other are connected in parallel and thus connected to high potential output and low potential output of the regulated voltage source 133 respectively.

The individual battery is connected to an output of the regulated voltage source which outputs and maintains the average voltage of the battery string by the bidirectional switch block to perform charging or discharging on the battery.

The regulated voltage sources 131~136 are inputted with total voltage of the battery string and output and maintain the average voltage of the battery string, and the regulated voltage sources 131~136 comprise a bidirectional DC-DC converter respectively. Specifically, a primary winding (input) of each bidirectional DC-DC converter 131~136 transformer is connected to the total voltage of the battery string and a secondary winding (output) of each bidirectional DC-DC converter 131~136 transformer is connected to the individual battery of the battery module via the bidirectional switch 121~126. Preferably, the bidirectional DC-DC converter is a bidirectional DC/DC converter with a negative feedback circuit.

Figure 3:
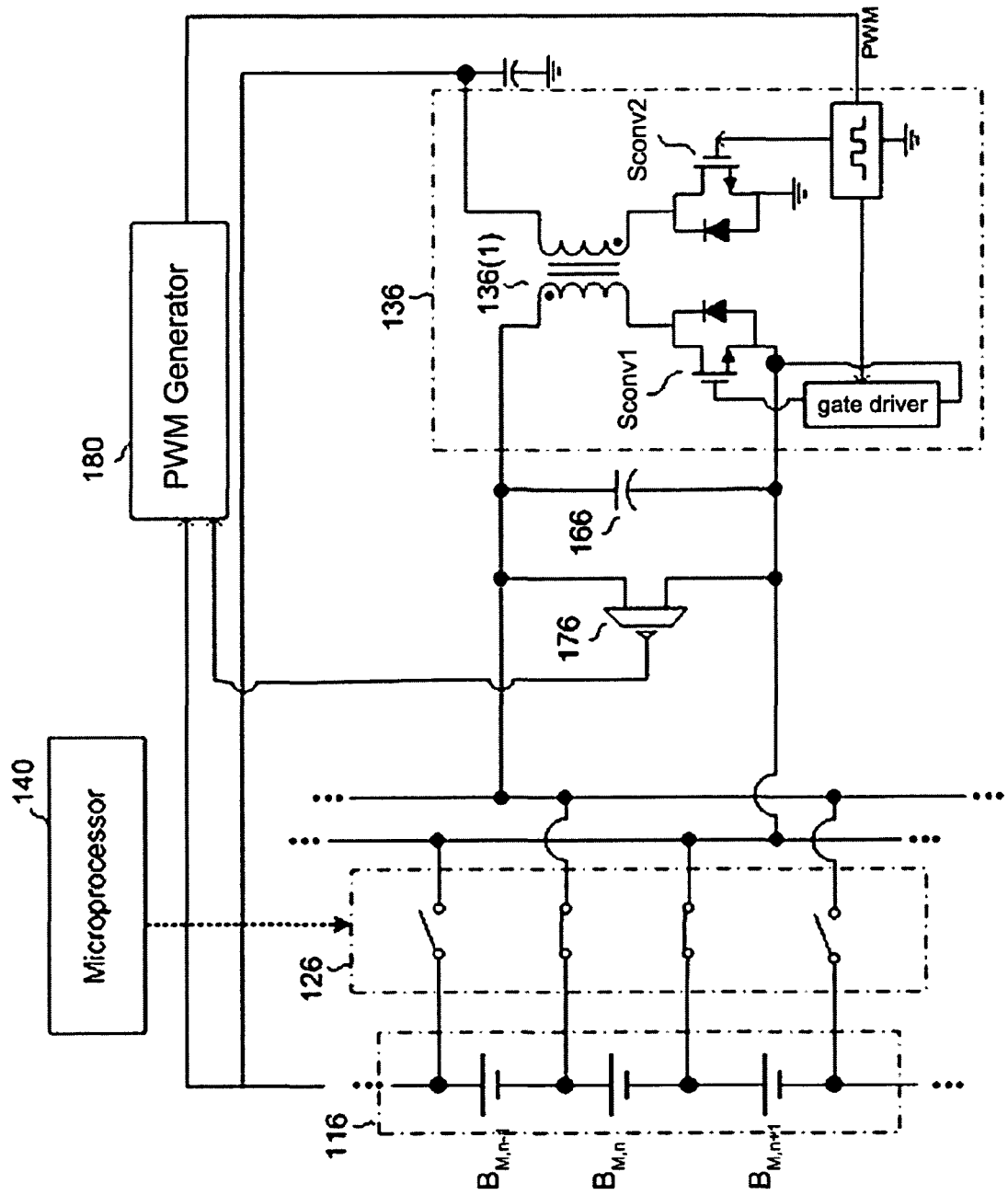
FIG. 3 is a diagram showing a partial structure of the automatic charge equalization apparatus according to the present invention at the time of charge equalization of a nth battery in Mth battery module.

FIG. 3 shows a case in which nth battery ($B_{M,n}$) of Mth battery module 116 is connected to the regulated voltage source 136 via the bidirectional switch block 126 controlled by the microprocessor 140.

As shown in FIG. 3, the regulated voltage source 136 comprises a bidirectional DC-DC converter 136(1) and converter switches $S_{conv}1$, $S_{conv}2$ are preferably provided in each terminal of the primary winding and the secondary winding of the bidirectional DC-DC converter 136(1) transformer. The converter switches $S_{conv}1$, $S_{conv}2$ are responsible for on/off of the DC-DC converter 136(1). Preferably, the converter switches $S_{conv}1$, $S_{conv}2$ comprise a diode which is connected to MOSFET element and a source terminal and a drain terminal of MOSFET to provide a current moving path opposite to that of MOSFET turn-on current.

The automatic charge equalization apparatus using the regulated voltage source according to the present invention comprises a Pulse Width Modulation (PWM) Signal Generator 180 generating a PWM signal. The converter switches $S_{conv}1$, $S_{conv}2$ are controlled by the PWM signal generated by the PWM signal generator 180 and the bidirectional DC-DC converter 136(1) outputs and maintains an average voltage of the battery string by a duty ratio of the PWM signal.

The PWM signal generator 180 is preferably provided for each battery module similarly to the bidirectional switch block and the regulated voltage source.

More specifically, the PWM signal generator 180 further comprises a duty ratio controller (not shown), in which the duty ratio controller is inputted with an output of the bidirectional DC-DC converter 136(1) and the average voltage of the battery string and compares them to change the duty ratio of the PWM signal.

Due to the duty ratio of the PWM signal controlled by the duty ratio controller of the PWM signal generator 180, the regulated voltage source 136 outputs and maintains the average voltage of the battery string and such regulated voltage source (output voltage of the regulated voltage source maintained at the average voltage of the battery string by controlling the duty ratio of the PWM signal) is connected to the individual battery $B_{M,n}$ composing the battery module 116 to perform charging or discharging on the battery. Therefore, the charge potential is caused due to total potential of the battery string if the individual battery $B_{M,n}$ is charged and the discharged electric energy is contributed to total potential of the battery string if the individual battery $B_{M,n}$ is discharged.

Specifically, the PWM signal generator 180 further comprises a capacitor 166 provided between the bidirectional switch block 126 and the bidirectional DC-DC converter 136(1) and a regulated voltage source output-voltage sensing unit 176, to measure an output of the regulated voltage source and feedback it to the duty ratio controller via the capacitor 166 and the regulated voltage source output-voltage sensing unit 176.

The regulated voltage source output-voltage sensing unit 176 is to measure a magnitude of the output voltage of the regulated voltage source via electric removal or ground removal from the secondary side without load effect.

Figure 4:
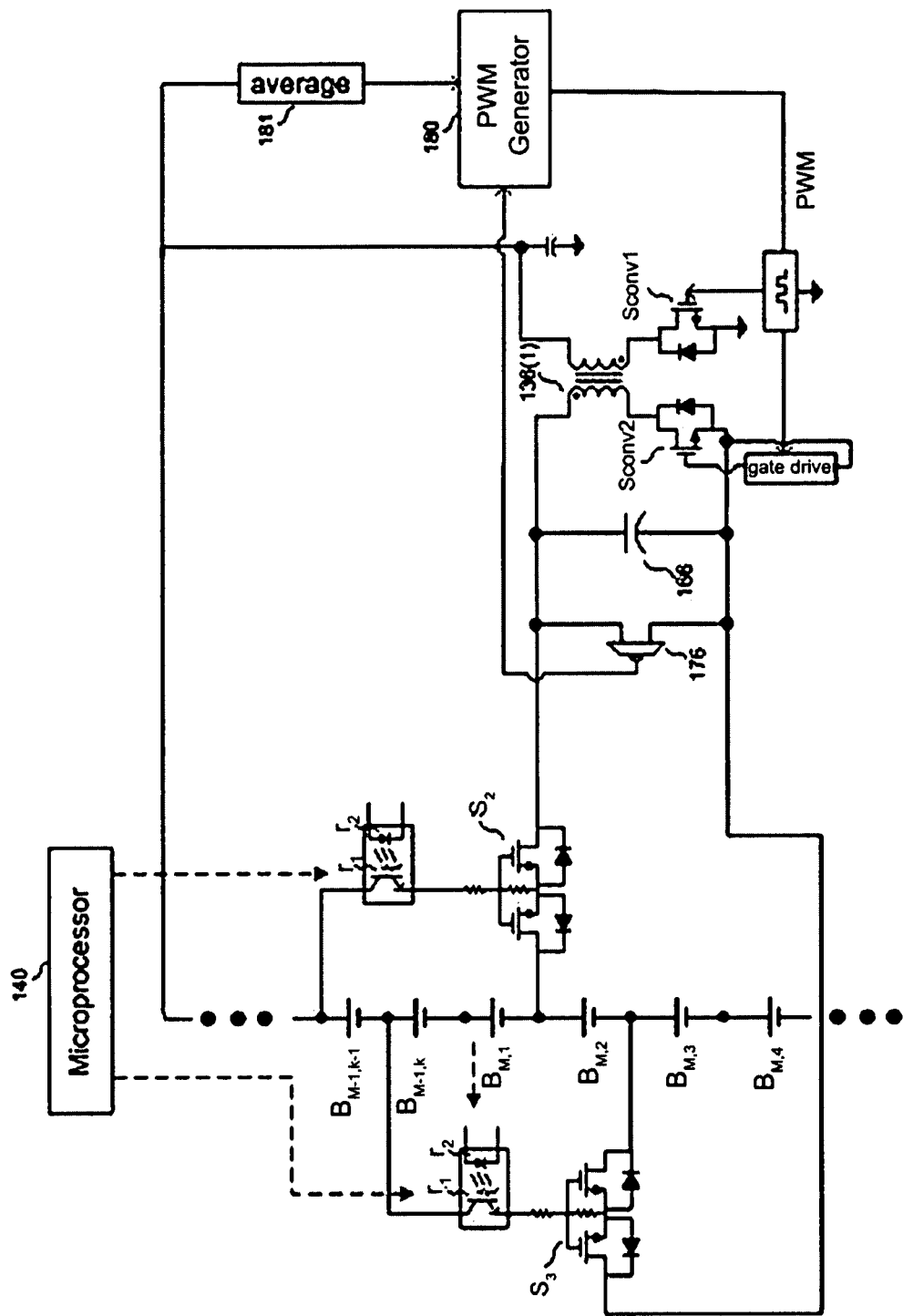
FIG. 4 is a diagram showing a partial structure of the charge equalization apparatus according to the present invention at the time of charge equalization of a second battery in Mth battery module.

Specifically, the duty ratio controller is inputted with total voltage of the battery string and thus inputted with the average voltage of the battery string 110 from the average voltage input unit 181 outputting the average voltage of the battery string 110 as shown in FIG. 4, to compare it with the output of the regulated voltage source feedbacked, so that the output of the regulated voltage source may be maintained at the average voltage of the battery string by controlling the duty ratio of the PWM signal.

The batteries (belonging to the same battery module) and the corresponding regulated voltage source are successively connected by the microprocessor 140 via the bidirectional switch block, in which the PWM signal generator 180 compares the average voltage of the battery string with the output voltage of the regulated voltage source to control the duty ratio of the converter switch $S_{conv}1$ and the converter switch $S_{conv}2$ provided in an input side of the DC-DC converter 136(1) via the negative feedback circuit so that the output of the DC-DC converter 136(1) is allowed to be identical to the average voltage of the battery string 110. The battery $B_{M,n}$ selected is connected to the regulated voltage source which is identical to the average voltage of the battery string 110 so that total energy of the battery string 110 is moved to the selected battery $B_{M,n}$ if the battery voltage $B_{M,n}$ selected is lower than the average voltage (regulated voltage source) of the battery string. In contrary, if the battery voltage $B_{M,n}$ selected is higher than the average voltage of the battery string, the voltage energy is moved from the corresponding battery of over-voltage to the total battery.

The DC-DC converter 136(1) provided in the regulated voltage source 136 may be a flyback-type DC-DC converter as shown in FIG. 3, though DC-DC converter of other type may be used.

FIG. 4 shows an example of charge equalization of a second battery in Mth battery module. For the purpose of easy understanding, FIG. 4 shows only bidirectional MOSFET switch which is controlled to form the current moving path of the second battery ($B_{M,2}$) of Mth battery module among the bidirectional switches, preferably bidirectional MOSFET switch provided in each terminal of the battery composing the battery module.

Since the bidirectional MOSFET switches $S_2$, $S_3$ are preferably a low voltage bidirectional MOSFET switch and operated in accordance with an ON/OFF signal of the microprocessor 140, to an input of the bidirectional MOSFET switch $S_2$, $S_3$ is preferably connected an electronic relay which can cause the ON/OFF signal.

The electronic relay may be a solid state relay or an optocoupler and is preferably consisted of a light-emitting diode r2 and a light-receiving element r1, as shown in FIG. 4. The light-receiving element r1 is preferably a Bipolar Junction Transistor (BJT). The BJT is placed in a low impedance state (turn-on state) by receiving the light of the light-emitting diode r2, so that the voltage of two or more batteries connected in series is applied to a gate of a MOSFET composing the bidirectional MOSFET switch.

Specifically, as shown in a dotted-line arrow of FIG. 4, the light-emitting diode r2 is emitted under the control of the microprocessor 140 for controlling the bidirectional switch block and the BJT r1 is turned on due to an emission of the light-emitting diode r2 to allow the turn-on voltage to be applied to the gate of the MOSFET composing the bidirectional MOSFET switch. At this time, Vgs (Vgs is a gate voltage taking a source voltage of MOSFET as a basis) is a voltage of the two or more batteries connected in series to turn on the MOSFET composing the bidirectional MOSFET switch as shown in FIG. 4. In a case of FIG. 4, the voltage of 3 batteries connected in series becomes Vgs which is applied upon turning on the MOSFET.

As mentioned above, one partial voltage of the battery string is used as a voltage which is to drive each bidirectional MOSFET switch composing the bidirectional switch block. The bidirectional MOSFET switch composing the bidirectional switch block uses one partial voltage of the battery string as a power source as shown in FIG. 4 and the electronic relay is provided in the gate, so that ON/OFF switch operation of high reliability is possible.

Figure 5:
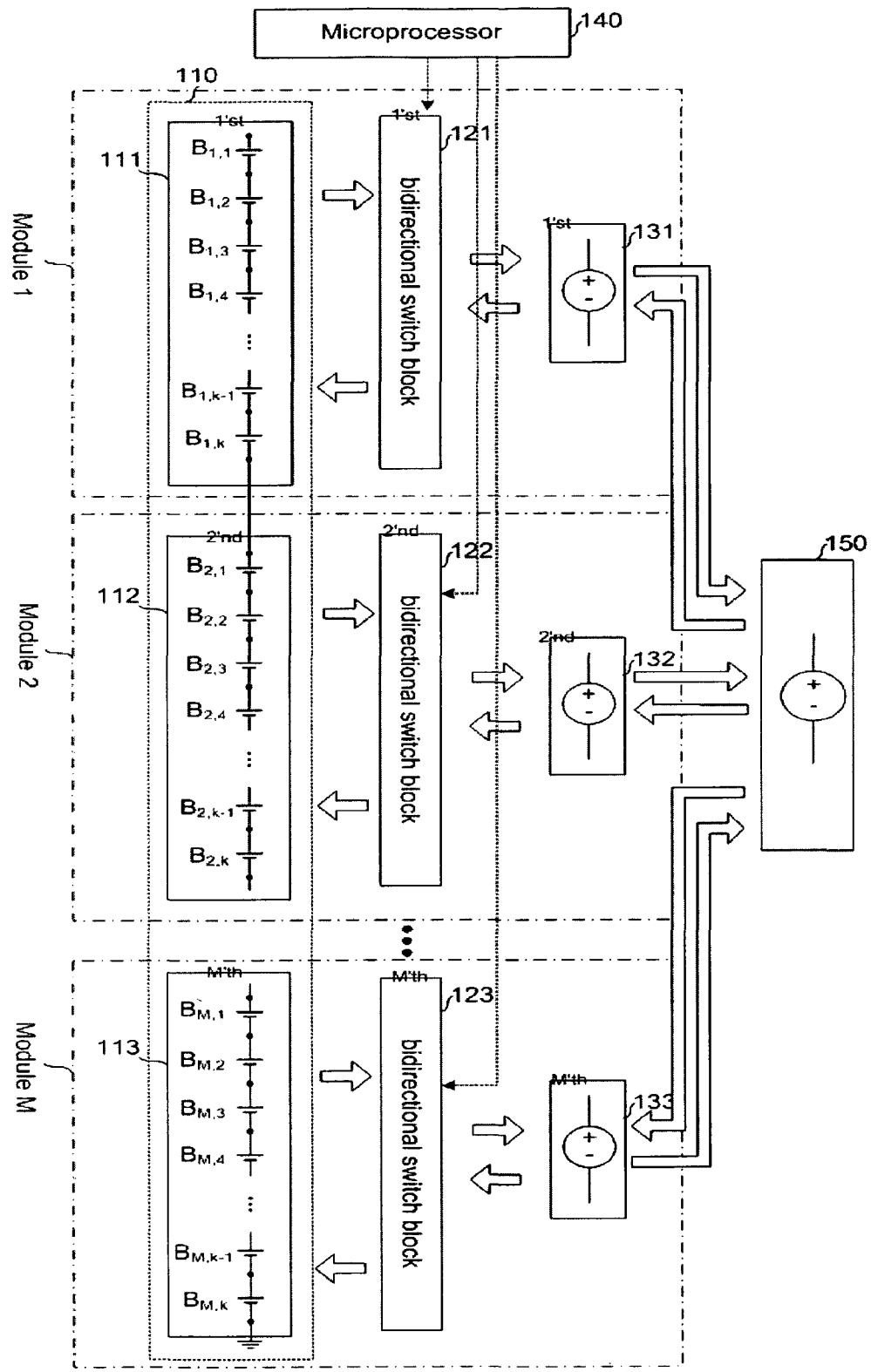
FIG. 5 is another structure diagram of an automatic charge equalization apparatus according to the present invention.

The automatic charge equalization apparatus using the regulated voltage source according to the present invention further comprises a battery-string regulated voltage source 150 provided in the input terminal (the primary winding side of the DC-DC converter transformer) of the regulated voltage source 121~123, as shown in FIG. 5.

At this time, the battery-string regulated voltage source 150 is inputted with total voltage of the battery string 110 and outputs lower voltage than the voltage inputted, and the inputs of all regulated voltage sources 121~123 are connected in parallel to the output of the battery-string regulated voltage source 150.

Figure 6:
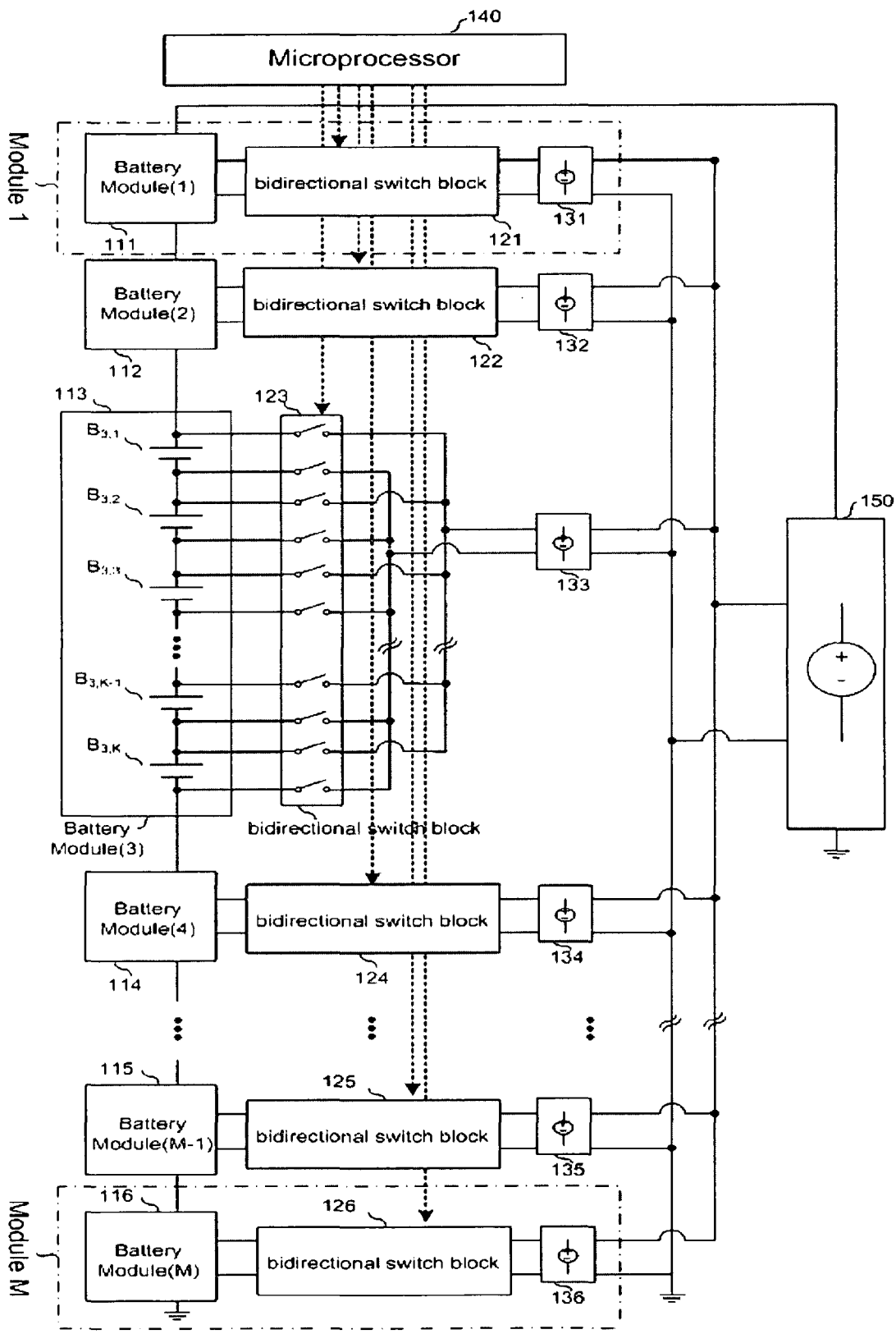
FIG. 6 is a diagram showing more detailed structure of the automatic charge equalization apparatus of FIG. 5 according to the present invention.

FIG. 6 shows more detailed structure of the charge equalization apparatus of FIG. 5. As shown in FIG. 5 and FIG. 6, since the charge equalization apparatus is inputted with total voltage of the battery string 110 and outputs the average voltage of the battery string 110 due to the structure of the two-stage regulated voltage sources 131~136 and 150, it is possible to reduce a voltage stress of the regulated voltage sources 131~136 in the second stage and structure the regulated voltage sources 131~136 with low capacity DC-DC converter 136(1).

At this time, the regulated voltage sources 131~136 operate similarly as mentioned above except for taking an output of the battery-string regulated voltage source 150 as an input and also the bidirectional switch blocks 121~126 operate similarly as mentioned above.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

The invention claimed is:
1. An automatic charge equalization apparatus using a regulated voltage source, comprising:
   a battery module having a plurality of batteries connected in series;
   a battery string having M (natural number of M≥2) battery modules connected in series;
   a regulated voltage source which is provided for each battery module and outputs and maintains an average voltage of the battery string;
   a bidirectional switch block which is provided for each battery module between the battery module and the regulated voltage source to connect each battery to an output of the regulated voltage source by forming a parallel current moving path to each battery composing the battery module; and a microprocessor controlling the bidirectional switch block, wherein each battery composing the battery module shares the regulated voltage source by the bidirectional switch block and the microprocessor controls the bidirectional switch block to successively connect the batteries composing the battery module with the regulated voltage source, and wherein the bidirectional switch block comprises multiple bidirectional Metal Oxide Semiconductor Field Effect Transistor (MOSFET) switches, and Vgs applied upon turning on the MOSFETs composing the bidirectional MOSFET switch comes from two or more series-connected batteries which are one part of the battery string.

2. The automatic charge equalization apparatus using a regulated voltage source according to claim 1, wherein the regulated voltage source comprises a bidirectional DC-DC converter, and the bidirectional DC-DC converter is inputted with total voltage of the battery string and outputs and maintains an average voltage of the battery string.

3. The automatic charge equalization apparatus using a regulated voltage source according to claim 2, further comprising a converter switch which controls ON/OFF operation of DC-DC converter in each terminal of a primary winding of an input and a secondary winding of an output in the bidirectional DC-DC converter.

4. The automatic charge equalization apparatus using a regulated voltage source according to claim 3, further comprising a pulse width modulation (PWM) signal generator generating a PWM signal, wherein the converter switch is controlled by the PWM signal and the bidirectional DC-DC converter outputs and maintains the average voltage of the battery string by a duty ratio of the PWM signal.

5. The automatic charge equalization apparatus using a regulated voltage source according to claim 4, wherein the PWM signal generator further comprises a duty ratio controller, wherein the duty ratio controller compares an output of the regulated voltage source with the average voltage of the battery string to change the duty ratio of the PWM signal so that the output of the regulated voltage source is maintained at an average voltage of the battery string to charge or discharge each battery composing the battery module.

6. The automatic charge equalization apparatus using a regulated voltage source according to claim 5, wherein the PWM signal generator further comprises a capacitor provided between the bidirectional switch block and the bidirectional DC-DC converter, and the capacitor is allowed to maintain a regular voltage and supply a direct current to each battery composing the battery module.

7. The automatic charge equalization apparatus using a regulated voltage source according to claim 4, wherein the microprocessor independently controls the bidirectional switch block for each battery module and forms a current moving path successively between each battery composing the battery module and the regulated voltage source starting from a lowermost battery or a uppermost battery of batteries composing the battery module.

8. The automatic charge equalization apparatus using a regulated voltage source according to claim 1, wherein the corresponding bidirectional switch block of the battery module consisted of k (natural number of k≥2) batteries comprises 2K bidirectional switches, and the bidirectional switch is connected to both terminals of one battery respectively on a basis of the one battery composing the battery module to form the parallel current moving path.

9. The automatic charge equalization apparatus using a regulated voltage source according to claim 8, wherein the regulated voltage source comprises a bidirectional DC-DC converter, and one side of each of the odd bidirectional switches is connected in parallel to allow it to be connected to one terminal of a secondary winding which is an output of the bidirectional DC-DC converter and one side of each of even bidirectional switches is connected in parallel to allow it to be connected to other terminal of a secondary winding which is an output of the bidirectional DC-DC converter on a basis of a lowermost battery or an uppermost battery of the batteries composing the battery module.

10. The automatic charge equalization apparatus using a regulated voltage source according to claim 1, further comprising an electronic relay provided in a gate of the MOSFET composing the bidirectional MOSFET switch.

11. The automatic charge equalization apparatus using a regulated voltage source apparatus according to claim 10, wherein the electronic relay comprises a light-emitting diode and a light-receiving element, and the light-emitting diode is emitted under the control of the microprocessor for controlling the bidirectional switch block.

12. The automatic charge equalization apparatus using a regulated voltage source according to claim 1, further comprising a battery-string regulated voltage source which is inputted with total voltage of the battery string and outputs lower voltage than the voltage inputted, wherein an input of the regulated voltage source is connected to an output of the battery-string regulated voltage source.

* * * * *